A. BELDAM.
VEHICLE TIRE.
APPLICATION FILED SEPT. 14, 1911.

1,011,013.

Patented Dec. 5, 1911.

Witnesses.

Inventor:
A. Beldam.

UNITED STATES PATENT OFFICE.

ASPLAN BELDAM, OF BALDOCK, ENGLAND.

VEHICLE-TIRE.

1,011,013.  Specification of Letters Patent.  Patented Dec. 5, 1911.

Application filed September 14, 1911. Serial No. 649,337.

*To all whom it may concern:*

Be it known that I, ASPLAN BELDAM, a subject of the King of England, residing at Baldock, Hertfordshire, England, have invented certain new and useful Improvements in or Connected with Vehicle-Tires, of which the following is a specification.

This invention has reference to spring wheels for vehicles, and it has particular reference to that type wherein the spring portion is adapted to be mounted as a whole on, and applied to, known forms of elastic and pneumatic tire rims of vehicle wheels.

In previously proposed means for attaching a spring mounted ring as a self contained structure, to a known form of wheel rim, the structure is positively connected to the wheel rim.

One of the objects of the invention, is to provide improvements in spring wheels of the above character, whereby a known form of spring portion, namely an outer ring with springs, can be applied to known forms of wheel rims adapted for the reception of pneumatic and like tires, without the necessity of positively connecting the same to such wheel rim, it being only necessary, to remove the tire from the wheel rim, if such is present, and to fit the spring portion thereto by introducing the springs into the wheel rim, and securing guide plates to the outer ring on each side of the rim.

Another object of the invention is to provide improvements in the several parts whereby they are rendered more efficient in use.

Under this invention the outer ring and spring mechanism are adapted to be fitted on to a known form of pneumatic wheel or like rim and to be held in place without the necessity of positively securing the ring or springs to the wheel rim, the springs being introduced onto the wheel rim, and the ring held in place by side plates, which are attached to the outer ring and are adapted to bear against each side of the wheel rim, and thus not only serve as guide plates to the spring mounted ring but also serve to hold the outer ring in its proper position laterally.

Figure 1:
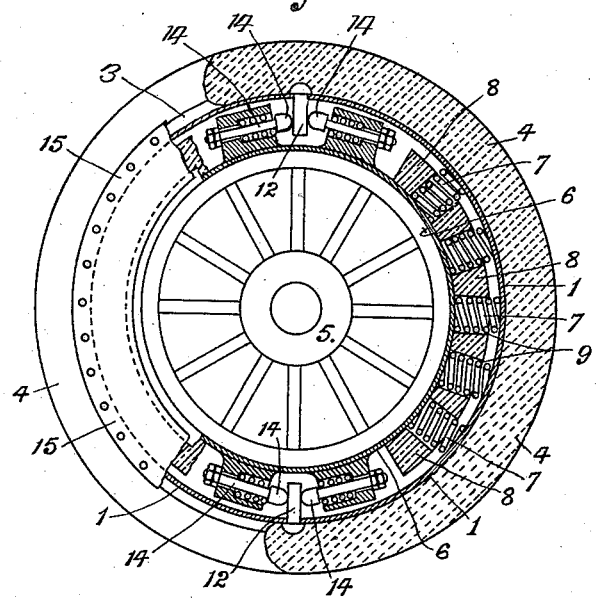
Figure 2:
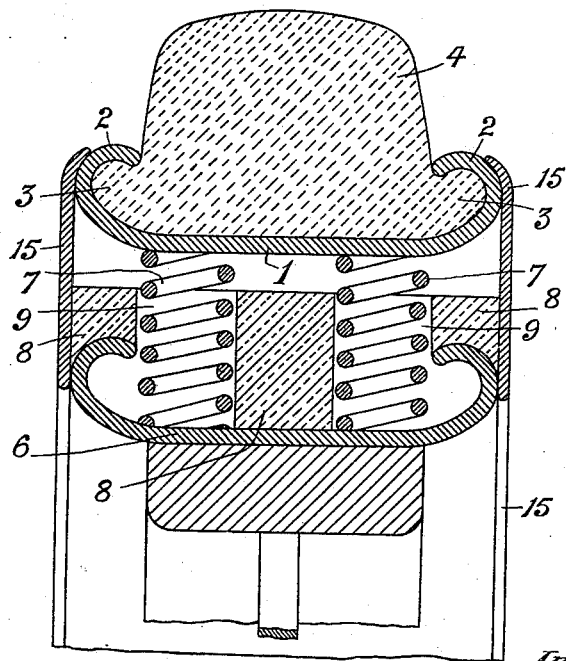

Referring to the drawings, Figure 1 is an elevation partly in section of a wheel constructed according to this invention, and Fig. 2 is a cross sectional view to an enlarged scale of part of Fig. 1.

In the drawings, 1 designates the outer ring having returned edges 2 which are adapted to receive the molded projecting edges 3 of the solid tire 4.

5 designates the hub of the wheel, and 6 the rim having incurved margins as used in connection with pneumatic tires and covers therefor. Springs 7 are in a compressed state disposed in a known manner between the outer ring 1 and inner rims 6, as shown in Fig. 2, although it will be understood that a less or greater number of sets of springs may be employed, according to the strength and resiliency of the wheels required. The inner rim 6 is fitted with blocks 8 of wood, aluminium, rubber, or other suitable material, or their equivalents, which take between the incurved edges of the pneumatic tire rim, and also project over the outer peripheries of such edges, as illustrated in the drawings; and the blocks are provided with apertures 9, adapted to serve as guides for the springs 7 for preventing lateral displacement thereof. The buffer springs 11 are circumferentially disposed in suitable abutments or blocks disposed in the inner rim 6, and are adapted to operate against projecting plates or devices 12 attached to the outer ring.

In the construction shown headed rods or pins 14 project through the rear of the abutment blocks 10, and being secured in position by nuts the abutment blocks 10 being secured to the inner rim. The springs and other parts between the two rims are inclosed by side plates 15, in the known manner, such side plates partaking partly of the configuration of the rims, as shown in Fig. 2, by curving partly over the curved portions of the rim; and serving to retain the radial springs 7 and the outer ring 1 in the proper position relatively to the inner rim 6, although it will be obvious that the blocks 8 serve toward this end also.

By the construction described with reference to the drawings, vehicle wheels of known construction of rims for pneumatic tires,—no matter whether they had been previously used for pneumatic tires or not,—may be fitted with the arrangement of springs and other parts, and outer rings provided with tires of non-pneumatic form, and thereby rendered durable in use, and very serviceable in preventing vibration and shock.

By the above improvements, spring wheel rings can be fitted to vehicle wheels adapted to receive and hold pneumatic tires, without the necessity of making any constructional alterations to the inner rims.

It will be understood that spring wheels for vehicles have already been proposed, wherein springs are provided for taking up radial and circumferential thrusts and are under compression when in position, and therefore no broad claim is made thereto.

What is claimed is:—

1. In combination, a wheel, spaced apart blocks formed with openings, and mounted on the rim of the wheel, springs mounted in the openings and extending beyond the outer plane of the blocks, a tire supporting rim mounted on the springs, a tire secured to the tire supporting rim, abutments extending inwardly from the tire supporting rim, abutments extending from the rim of the wheel, projections extending from two adjacent abutments on the wheel rim and engaging the opposite side of one of the abutments on the tire supporting rim, springs between the abutments on the tire supporting rim, and the abutments on the wheel rim to provide cushions, and side plates extending from the rim of the wheel to the tire supporting rim to inclose the springs.

2. In combination, a wheel, a tire supporting rim surrounding the wheel and spaced from the rim of the latter radially disposed springs interposed between the rim of the wheel and the tire supporting rim to support the latter, spaced abutments projecting from the rim of the wheel, abutments projecting inwardly from the tire supporting rim between the abutments on the wheel rim, headed rods slidably mounted in the abutments projecting from the rim of the wheel and engaging one on each side of the abutments projecting from the tire supporting rim, springs interposed between the heads of the rods and the abutments on the rim of the wheel to force said heads into contact with the abutments on the tire supporting rim, and side plates extending from the rim of the wheel to the tire supporting rim.

In testimony whereof I have signed my name to this specification in the presence of two subscribing witnesses.

ASPLAN BELDAM.

Witnesses:
 JOSEPH ARCHER,
 S. E. SOMERVILLE.

---

Copies of this patent may be obtained for five cents each, by addressing the "Commissioner of Patents, Washington, D. C."